United States Patent
Braithwaite et al.

(10) Patent No.: US 9,273,239 B2
(45) Date of Patent: Mar. 1, 2016

(54) METHOD FOR PROPORTIONALLY MIXING TWO CRYOGENIC FLUIDS

(71) Applicant: Air Liquide Industrial U.S. LP, Houston, TX (US)

(72) Inventors: David C. Braithwaite, Houston, TX (US); Scott Terdic, Houston, TX (US)

(73) Assignee: Air Liquide Industrial U.S. LP, Houston, TX (US)

( * ) Notice: Subject to any disclaimer, the term of this patent is extended or adjusted under 35 U.S.C. 154(b) by 29 days.

(21) Appl. No.: 14/013,417

(22) Filed: Aug. 29, 2013

(65) Prior Publication Data

US 2015/0060722 A1 Mar. 5, 2015

(51) Int. Cl.
*F17D 1/00* (2006.01)
*C09K 5/00* (2006.01)
*B01F 15/00* (2006.01)

(52) U.S. Cl.
CPC .............. *C09K 5/00* (2013.01); *B01F 15/00207* (2013.01); *F25J 2280/02* (2013.01); *Y10T 137/0329* (2015.04); *Y10T 137/2509* (2015.04)

(58) Field of Classification Search
CPC .... G05D 11/132; G05D 11/139; G05D 21/02
USPC .................... 137/3, 88, 93; 366/152.1; 62/657
See application file for complete search history.

(56) References Cited

U.S. PATENT DOCUMENTS

| | | | | |
|---|---|---|---|---|
| 3,530,867 A | * | 9/1970 | Hass | 137/3 |
| 5,158,675 A | * | 10/1992 | Allington et al. | 210/198.2 |
| 5,674,382 A | * | 10/1997 | Chapman | 210/96.1 |
| 5,865,206 A | * | 2/1999 | Steigman et al. | 137/7 |
| 6,293,525 B1 | * | 9/2001 | Ginsburgh et al. | 261/77 |
| 8,002,457 B2 | * | 8/2011 | Cottrell et al. | 366/152.1 |
| 2002/0034122 A1 | * | 3/2002 | Lemke | 366/136 |
| 2006/0174941 A1 | * | 8/2006 | Cohen et al. | 137/93 |

* cited by examiner

*Primary Examiner* — R. K. Arundale
(74) *Attorney, Agent, or Firm* — Elwood L. Haynes

(57) ABSTRACT

A method of proportionally mixing two fluids is provided. The method includes introducing a first fluid stream, introducing a second fluid stream, wherein the flow rate of the second stream is modulated by a valve, thereby producing a modulated stream, combining the first fluid stream and the second fluid stream, thereby forming a compounded fluid stream, introducing said compounded fluid stream into a fluid containment region, wherein a vapor fraction and a liquid fraction are formed, determining the composition of the vapor fraction, comparing the composition of the vapor fraction with a predetermined composition to determine a composition error, and modulating the valve to reduce the composition error to a predetermined error.

8 Claims, 3 Drawing Sheets

METHOD FOR PROPORTIONALLY MIXING TWO CRYOGENIC FLUIDS

BACKGROUND

There are certain industrial gas applications, such as specialized welding process or cryogenic food refrigeration, where it is advantageous to combine the primary liquid cryogen (for example liquid nitrogen or liquid argon) with a lesser proportion of liquid oxygen prior to delivery of the compounded liquid or prior to the point of use. However, accurate flows of cryogenic liquid are difficult to maintain due to pressure and temperature fluctuations in storage conditions at the supply tank, which impact line pressure and flow rate.

Hence, a need exists in the industry, for a means for proportionally mixing two cryogenic fluids.

SUMMARY

A method of proportionally mixing two fluids is provided. The method includes introducing a first fluid stream, introducing a second fluid stream, wherein the flow rate of the second stream is modulated by a valve, thereby producing a modulated stream, combining the first fluid stream and the second fluid stream, thereby forming a compounded fluid stream, introducing said compounded fluid stream into a fluid containment region, wherein a vapor fraction and a liquid fraction are formed, determining the composition of the vapor fraction, comparing the composition of the vapor fraction with a predetermined composition to determine a composition error, and modulating the valve to reduce the composition error to a predetermined error.

In another embodiment of the present invention, the method includes introducing a first fluid stream, introducing a second fluid stream, wherein the flow rate of the second stream is modulated by a valve, thereby producing a modulated stream, combining the first fluid stream and the second fluid stream, thereby forming a compounded fluid stream, introducing said compounded fluid stream into a fluid containment region, removing a portion of the compounded fluid stream and determining the composition, comparing the composition of compounded fluid stream with a predetermined composition to determine a composition error, and modulating the valve to reduce the composition error to a predetermined error.

In another embodiment of the present invention, the method includes introducing a first fluid stream, introducing a second fluid stream, wherein the flow rate of the second stream is modulated by a valve, thereby producing a modulated stream, combining the first fluid stream and the second fluid stream, thereby forming a compounded fluid stream, introducing said compounded fluid stream into a process, thereby producing a vapor stream, removing a portion of the vapor stream and determining the composition, comparing the composition of the vapor stream with a predetermined composition to determine a composition error, and modulating the valve to reduce the composition error to a predetermined error.

DESCRIPTION OF PREFERRED EMBODIMENTS

Figure 1:
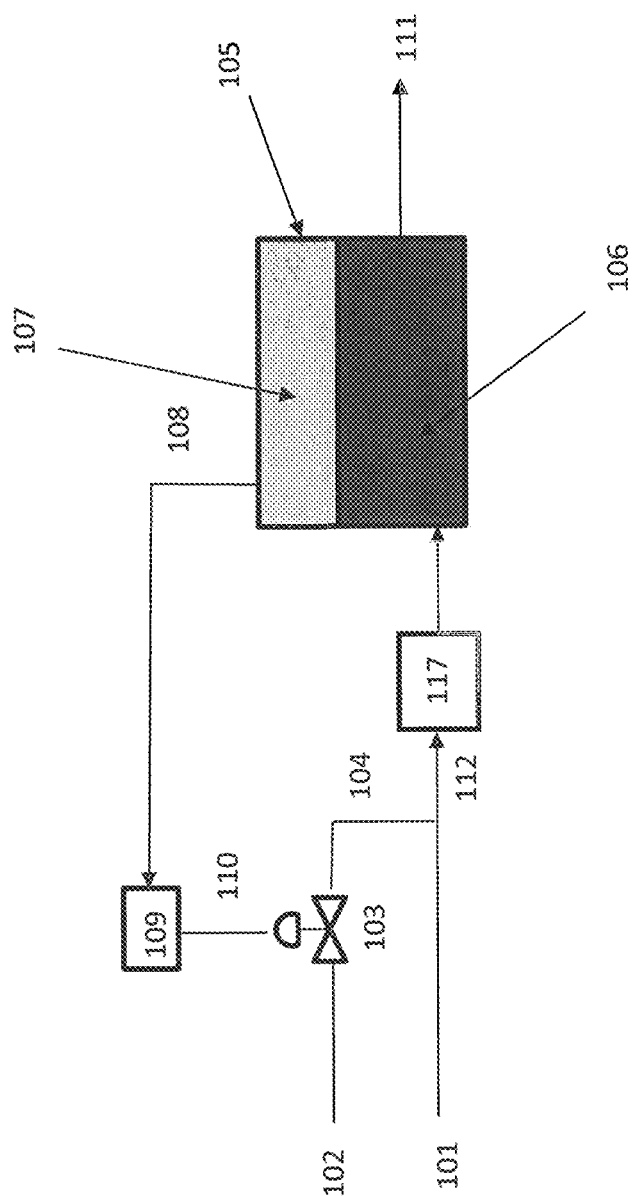
FIG. 1 illustrates one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1, a method for proportionally mixing two cryogenic fluids is presented. A first fluid stream 101 and a second fluid stream 102 are provided. The first fluid stream 101 and the second fluid stream 102 may be cryogenic. The first fluid stream 101 may be nitrogen. The first fluid stream 101 may be argon. The second fluid stream 101 may be oxygen. The flow rate of the second fluid stream 102 is modulated by valve 103. The modulated stream 104 is then combined with the first fluid steam 101 to form compounded fluid stream 112. A static mixer 117, or any other means known to the skilled artisan, may be used to combine these two streams.

The compounded fluid stream 112 is then introduced into fluid containment region 105. Fluid containment region 105 may be a tank, a pressure vessel, or a pipeline. A vapor fraction 107 and a liquid fraction 106 may form inside fluid containment region 105. A sample 108 of the vapor fraction 107 is removed and analyzed 109, to determine the actual composition of the vapor section. The actual composition may be the percentage of oxygen present in the vapor section 107. If necessary, a correction factor may be applied to the actual composition of the vapor section 107, in order to estimate the vapor fraction of the liquid section 106. The actual composition, or corrected actual composition if necessary, is then compared to a predetermined composition to determine a composition error. If the composition error is greater than a predetermined error, a signal 110 is sent to valve 103, and the flow rate of modulated stream 104 is either increased or decreased, so as to reduce the composition error and to satisfy the predetermined error. A portion of the liquid 106 may be removed as liquid product stream 111.

In one embodiment of the present invention, the predetermined composition is between 2% and 22% oxygen, preferably between 5% and 21% oxygen, even more preferably between 10% and 20% oxygen. In another embodiment of the present invention, the predetermined error is less than 5%, preferably less than 3%.

Figure 2:
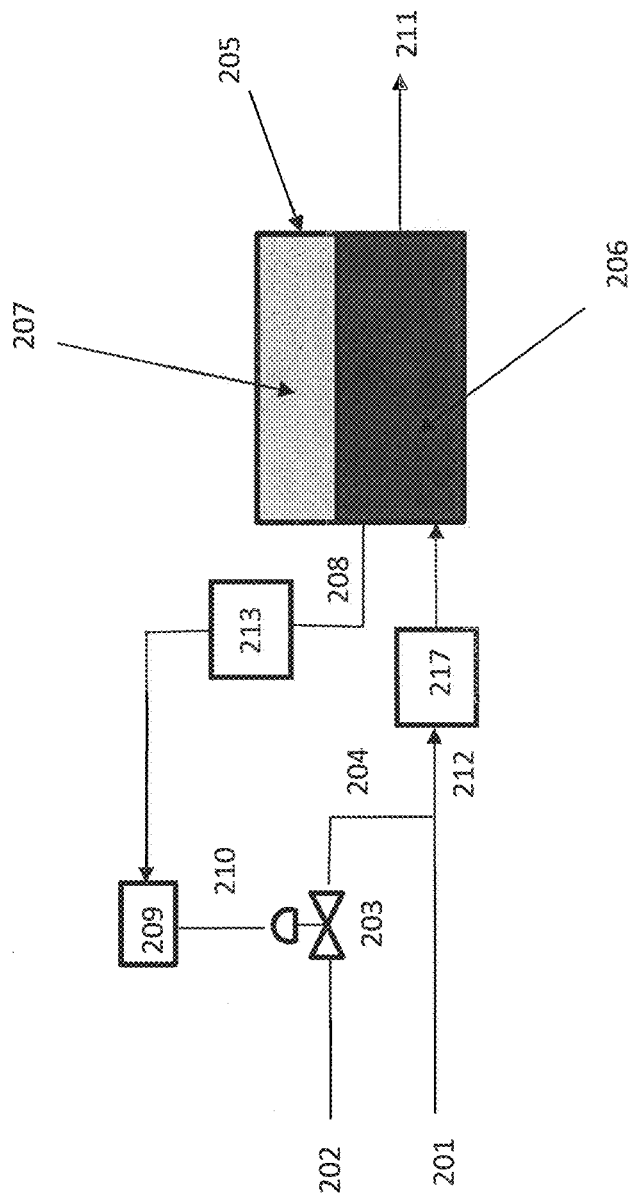
FIG. 2 illustrates another embodiment of the present invention.

Turning now to FIG. 2, another embodiment of the present invention is presented. A first fluid stream 201 and a second fluid stream 202 are provided. The first fluid stream 201 and the second fluid stream 202 may be cryogenic. The first fluid stream 201 may be nitrogen. The first fluid stream 201 may be argon. The second fluid stream 201 may be oxygen. The flow rate of the second fluid stream 202 is modulated by valve 203. The modulated stream 204 is then combined with the first fluid steam 201 to form compounded fluid stream 212. A static mixer 217, or any other means known to the skilled artisan, may be used to combine these two streams.

The compounded fluid stream 212 is then introduced into fluid containment region 205. Fluid containment region 205 may be a tank, a pressure vessel, or a pipeline. A vapor fraction 207 and a liquid fraction 206 may form inside fluid containment region 205. A sample 208 of the liquid fraction 206 is removed, vaporized in vaporizer 213, and the vapor analyzed 209, to determine the actual composition of the vapor section. The actual composition will be the percentage of oxygen present in the liquid section 206. The actual composition is then compared to a predetermined composition to determine a composition error. If the composition error is greater than a predetermined error, a signal 210 is sent to valve 203, and the flow rate of modulated stream 204 is either increased or decreased, so as to reduce the composition error and to satisfy the predetermined error. A portion of the liquid 206 may be removed as liquid product stream 211.

In one embodiment of the present invention, the predetermined composition is between 2% and 22% oxygen, preferably between 5% and 21% oxygen, even more preferably between 10% and 20% oxygen. In another embodiment of the present invention, the predetermined error is less than 5%, preferably less than 3%.

Figure 3:
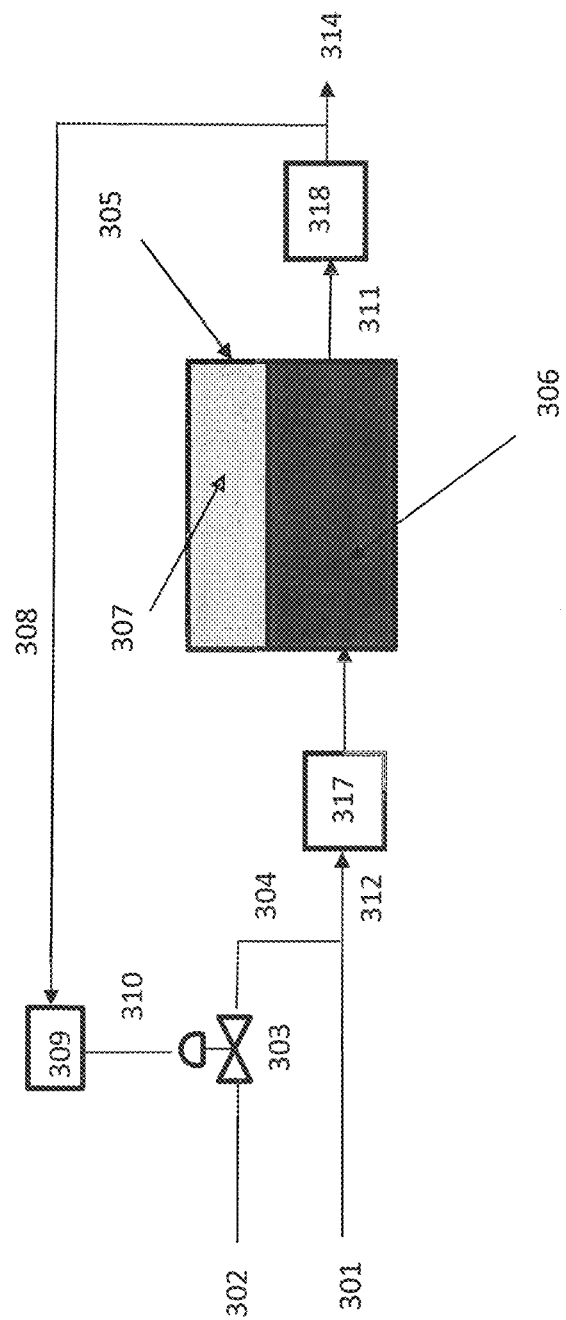
FIG. 3 illustrates another embodiment of the present invention

Turning now to FIG. 3, another embodiment of the present invention is presented. A first fluid stream 301 and a second fluid stream 302 are provided. The first fluid stream 301 and the second fluid stream 302 may be cryogenic. The first fluid stream 301 may be nitrogen. The first fluid stream 301 may be argon. The second fluid stream 301 may be oxygen. The flow rate of the second fluid stream 302 is modulated by valve 303. The modulated stream 304 is then combined with the first fluid steam 301 to form compounded fluid stream 312. A static mixer 317, or any other means known to the skilled artisan, may be used to combine these two streams.

The compounded fluid stream 312 is then introduced into fluid containment region 305. Fluid containment region 305 may be a tank, a pressure vessel, or a pipeline. A vapor fraction 307 and a liquid fraction 306 may form inside fluid containment region 305. Product liquid stream 306 will leave fluid containment region 305 and be introduced into process 318, wherein it is vaporized into stream 314.

A sample 308 of the stream 314 is removed and the vapor analyzed 309, to determine the actual composition of the vapor section. The actual composition will be the percentage of oxygen present in the liquid section 306. The actual composition is then compared to a predetermined composition to determine a composition error. If the composition error is greater than a predetermined error, a signal 310 is sent to valve 303, and the flow rate of modulated stream 304 is either increased or decreased, so as to reduce the composition error and to satisfy the predetermined error.

In one embodiment of the present invention, the predetermined composition is between 2% and 22% oxygen, preferably between 5% and 21% oxygen, even more preferably between 10% and 20% oxygen. In another embodiment of the present invention, the predetermined error is less than 5%, preferably less than 3%.

What is claimed is:

1. A method of proportionally mixing two fluids, comprising:
   a) introducing a first fluid stream,
   b) introducing a second fluid stream, wherein the flow rate of the second stream is modulated by a valve, thereby producing a modulated stream,
   c) combining the first fluid stream and the second fluid stream, thereby forming a compounded fluid stream,
   d) introducing said compounded fluid stream into a fluid containment region, wherein a vapor fraction and a liquid fraction are formed,
   e) determining the composition of the vapor fraction,
   f) comparing the composition of the vapor fraction with a predetermined composition to determine a composition error, and
   g) modulating the valve to reduce the composition error to a predetermined error
wherein the first fluid stream and the second fluid stream are cryogenic fluids.

2. The method of claim 1, wherein the first fluid stream is nitrogen.

3. The method of claim 1, wherein the first fluid stream is argon.

4. The method of claim 1, wherein the second fluid stream is oxygen.

5. The method of claim 1, wherein the step of determining the composition of the vapor fraction comprises determining the percentage of oxygen present.

6. The method of claim 1, wherein the predetermined composition of the vaporized compounded liquid is between 2% and 22% oxygen.

7. The method of claim 1, wherein the first fluid stream and the modulated stream are combined by means of a static mixer.

8. The method of claim 1, further comprising withdrawing a liquid product stream from the fluid containment region.

* * * * *